United States Patent [19]
Lenzer et al.

[11] Patent Number: 4,730,776
[45] Date of Patent: Mar. 15, 1988

[54] DISPLACEABLE AND LOCKABLE CHOPPER CUTTING EDGE

[75] Inventors: Xaver Lenzer, Koetz; Eberhard Wistuba, Rettenbach; Martin Nusser, Niederstotzingen, all of Fed. Rep. of Germany

[73] Assignee: Karl Mengele & Sohne GmbH & Co., Günzburg, Fed. Rep. of Germany

[21] Appl. No.: 916,280

[22] Filed: Oct. 7, 1986

[30] Foreign Application Priority Data

Oct. 8, 1985 [DE] Fed. Rep. of Germany ....... 3535902

[51] Int. Cl.⁴ .............................................. B02C 18/18
[52] U.S. Cl. ..................................... 241/241; 241/286
[58] Field of Search ...................... 241/222, 101.7, 239, 241/240, 241, 286, 37, 290

[56] References Cited

U.S. PATENT DOCUMENTS

| 221,371 | 11/1879 | Stevens | 241/241 X |
| 4,084,752 | 4/1978 | Hagiwara et al. | 241/241 X |
| 4,190,209 | 2/1980 | De Buhr et al. | 241/241 X |
| 4,295,616 | 10/1981 | Hill | 241/241 |
| 4,606,178 | 8/1986 | Saiia | 241/241 X |

Primary Examiner—Mark Rosenbaum
Attorney, Agent, or Firm—Toren, McGeady & Associates

[57] ABSTRACT

In a chopper, at least one cutter rotates about an axis moving over a retaining wall of a chopper housing and past an opposing knife edge located at the inlet opening into the chopper. The opposing knife edge is adjustably supported on a support relative to the plane or circle of revolution of the cutter. An adjustment device actuatable at a location exterior of the chopper housing effects the adjustment of the opposing knife edge when a locking device is released. The locking device includes a clamping device for pressing the opposite ends of the opposing cutting edge against the support. A force accumulator provides an elastic force for maintaining the clamping action. The locking device also includes a releasing device acting against the force accumulator for releasing the clamping action.

8 Claims, 2 Drawing Figures

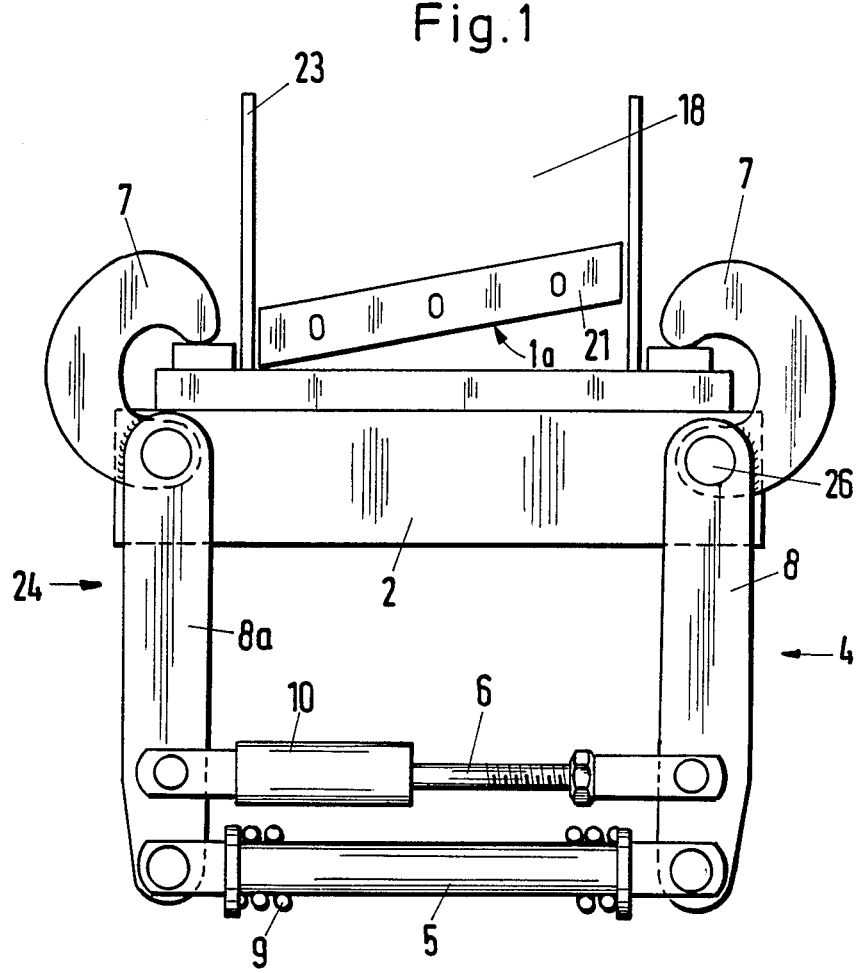

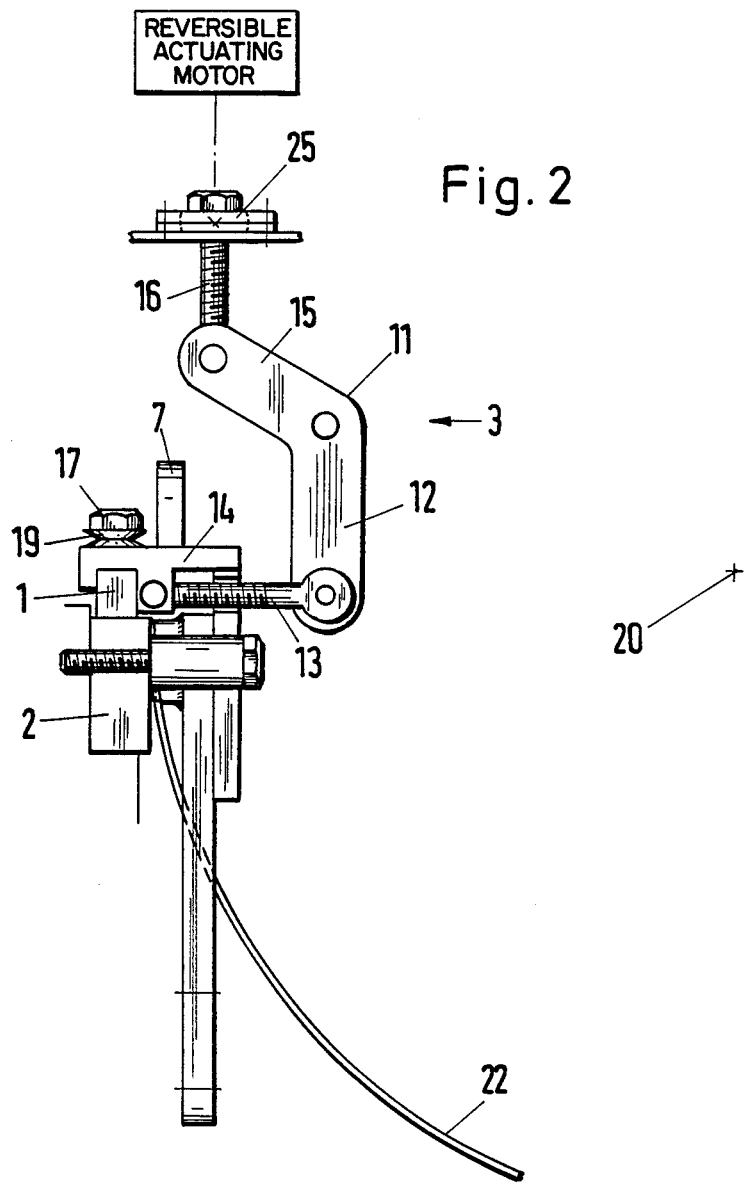

DISPLACEABLE AND LOCKABLE CHOPPER CUTTING EDGE

The invention is directed to a chopper or similar crusher with at least one cutter rotating around an axis of rotation of the cutter shaft and sweeping with its cutting edge along the retaining wall of the chopper housing while observing a circumferential gap past an opposing knife edge wherein the opposing knife edge on an opposing knife edge support is adjustable with respect to the plane of revolution of the cutter cutting edge by means of a displacement or adjustment device and a locking device.

In a known chopper of this type, such as disclosed in U.S. Pat. No. 4,295,616, the displacement device consists of wedge-type gearing, in which the wedges are driven by a machine screw. Machine screws, actuatable from an easily accessible spot of the chopper, serve for locking.

Such an arrangement is disadvantageous, because several screws must be loosened when adjusting the opposing knife edge and that the wedge type gearing consisting of a drivable part and a driven part is very expensive and permits remote control only with difficulty.

Contrary to the known chopper the task of the invention consists in creating a displacement and locking device permitting easy remote operation.

The invention is explained and described in the drawing with the help of an embodiment example.

FIG. 1 is a partial view of a chopper in the region of the chopper inlet opening; and FIG. 2 is a side view of the device according to FIG. 1.

In the drawing the opposing knife edge, arranged at the lower edge of the cutter inlet opening 18, is designated with 1, the cutter shaft of the cutters 21 is designated with 20 and is shown schematically in FIG. 1. Cutters 21 have a cutting edge 1a and rotate around the axis of the cutter shaft 20 over a retaining wall 22 of a chopper housing 23, shown only in part. The cutting edge 1a of the cutters 21 maintains a gap with the retaining wall 22 and sweeps past the opposing knife edge 1 at the inlet opening 18.

The opposing knife edge 1 is adjustable relative to the plane of revolution of the cutters 21.

The opposing knife edge 1 is elastically screwed on by means of screws 17 beneath whose heads spring washers 19 are arranged. Non-depicted elongated holes in the opposing knife edge 1 and in a clamping plate 14 enable a displacement of the opposing knife edge with respect to the cutters 21. A displacement or adjustment device 3 serves for adjustment of the opposing knife edge in accordance with the invention. The displacement device 3 includes a bell crank 11 supported at a stationary joint 25. The bell crank 11 has a load arm 12 connected with the opposing knife edge 1 by means of a connecting or con rod 13 and the clamping plate 14 and a force arm 15 actuatable by means of a spindle 16 driven by a reversible actuating motor.

A locking device 4 includes a clamping device 24 with clamping or wedging jaws 7, discernable in FIG. 1, engages, according to the invention, at the clamping plate 14 located on an opposing knife edge support 2. The clamping jaws 7 are located on the opposite end of the clamping plate 14. The clamping jaws 7 are part of a lever supported on stationary bearings 26. A pressure spring 9 engages between the levers comprising force arms 8, 8a and constitutes a force accumulator 5. A hydraulic cylinder-piston unit 10 forming part of a releasing device 6 connected to the force arms 8, 8a acts counter to the clamping force, of the pressure spring 9 acting on the clamping jaws 7 and causes a release of the clamping jaws 7 for readjustment of the opposing knife edge 1.

When the clamping action of the opposing knife edge is released, the screws 17 and washers 19 prevent the opposing knife edge from tilting.

While a specific embodiment of the invention has been shown and described in detail to illustrate the application of the inventive principles, it will be understood that the invention may be embodied otherwise without departing from such principles.

We claim:

1. A chopper comprising a chopper housing (23) including a circumferentially extending retaining wall (22), said retaining wall having an inlet opening into said housing, at least one cutter (21) having a cutting edge (1a) rotatably mounted about an axis (20) within said housing and said cutting edge arranged to sweep over said retaining wall and past an opposing knife edge (1) located at the inlet opening to said housing, said cutting edge (1) is rotatable around a circle of revolution and maintains a gap with the retaining wall and opposing knife edge during rotation, said opposing knife edge (1) is elongated in the direction of rotation of said cutter and has a pair of opposite ends and is supported on a support (2), an adjustment device (3) for adjusting the gap between said opposing knife edge (1) and said cutting edge (1a) of said cutter (21), a locking device (4) for clamping said opposing knife edge in position, said adjustment device (3) being accessible at a location on the exterior of said chopper housing, wherein the improvement comprises that said locking device includes a clamping device (24) for pressing the opposite ends of said opposing knife edge (1) against said support (2), said clamping device (24) includes clamping means and a force accumulator for pressing the clamping means against said opposing knife edge, and a releasing device (6) acting counter to said force accumulator (5) for releasing the clamping of said opposing knife edge.

2. A chopper, as set forth in claim 1, wherein said clamping device (24) comprises a pair of levers each located adjacent one of the opposite ends of said opposing knife edge (1), said clamping means comprises a clamping jaw (7) attached to each of said levers and arranged to engage a clamping plate (14) for clamping said opposing ends of said opposing knife edge (1), and said force accumulator (5) and said releasing device (6) disposed in engagement with said levers (8) at locations spaced from said clamping jaws (7).

3. A chopper, as set forth in claim 1, wherein said force accumulator (5) includes a pressure spring (9) for pressing said clamping means against said opposing knife edge (1).

4. A chopper, as set forth in claim 1, wherein said releasing device (6) includes a hydraulic oil cylinder (10).

5. A chopper, as set forth in claim 1, wherein said adjustment device (3) comprises a bell crank (11), said bell crank having a load arm (12) and a force arm (15), a connecting rod (13) connecting said load arm (12) with said opposing knife edge (1) and a spindle (16) connected to said force arm (15) for effecting movement of said bell crank (11) and adjustment of said opposing knife edge (1).

6. A chopper, as set forth in claim 5, wherein said spindle (16) is driven by a reversible actuating motor.

7. A chopper, as set forth in claim 1, wherein means secure said opposing knife edge (1) on said support (2) for prestressing said opposing knife edge, said prestressing means comprises at least two screws (17) located laterally of said inlet opening and securing said opposing knife edge (1) to said support (2), springs (19) mounted on each of said screws and pressing said opposing knife edge against said support so that in the released state of said locking device (4) a required pressure force acts on said opposing knife edge for preventing tilting of the opposing knife edge.

8. A chopper, as set forth in claim 7, wherein said screws are stationary and the opposing knife edge and the support therefor are displaceable in the direction of said cutter (21).

* * * * *